June 3, 1969 C. A. BOOKER, JR., ET AL 3,448,402

PHASE LOCKED OSCILLATOR

Filed Oct. 28, 1965 Sheet 1 of 2

WITNESSES

Wm. B. Sellers.

James F. Young

INVENTORS

Clyde A. Booker, Jr. and Francis T. Thompson

BY E. F. Possessky

ATTORNEY

June 3, 1969 C. A. BOOKER, JR., ET AL 3,448,402

PHASE LOCKED OSCILLATOR

Filed Oct. 28, 1965 Sheet 2 of 2

United States Patent Office 3,448,402

Patented June 3, 1969

3,448,402

PHASE LOCKED OSCILLATOR

Clyde A. Booker, Jr., Churchill, Pittsburgh, and Francis T. Thompson, Penn Hills Township, Verona, Pa., assignors to Westinghouse Electric Corporation, Pittsburgh, Pa., a corporation of Pennsylvania Filed Oct. 28, 1965, Ser. No. 505,533
Int. Cl. H03b 3/04
U.S. Cl. 331—8 7 Claims

ABSTRACT OF THE DISCLOSURE

A variable frequency voltage controlled unijuncton transistor oscillator generates an output which is phase locked to the steady state phase and frequency of a reference power line signal having a nominal frequency of 60 cycles per second. A frequency control loop and a phase control loop detect frequency and phase errors and vary the oscillator control voltage to produce the phase locked output. The response of the frequency and phase controls is set to provide phase lock to reference signal changes which persist for a predetermined minimum duration.

*Background of the invention*

The present invention relates to phase locked oscillators and, more particularly, to oscillators which are especially adapted but not limited to low frequency applications.

Generally, phase locked oscillators are employed where it is desired to produce an output having a frequency and phase which conforms in a predetermined manner to the frequency and phase of a reference signal. For example, television synchronizing signals are often frequency and phase controlled by reference to a crystal or other fixed frequency signal and in some cases by reference to the 60-cycle utility power waveform. However, the power waveform is variable and is usually inadequate as a reference signal for applications where it is desired to hold a constant output frequency.

In other applications, a phase locked oscillator can be used to generate an output signal which clocks the operation of predetermined electronic circuitry. For example, as described in a copending application Ser. No. 505,532, entitled "Analog to Digital Conversion System Having Improved Accuracy," filed by F. G. Willard, F. T. Thompson and C. A. Booker on Oct. 28, 1965, and assigned to the present assignee, an analog input system for a digital computer requires periodic integrator gating for successive predetermined time periods. In particular, elimination of power noise voltage from analog signals by an integration process requires that each period of integration to equal to one or more power cycles. However, to maximize noise elimination by integration and to minimize signal integration error, the period of integration is required to follow only steady state power frequency and phase changes and not transient power frequency and phase changes caused by power line switching and the like. A fixed frequency reference having the nominal power frequency therefore cannot be used, and known phase locked oscillators generally are not capable of meeting the requirements of the integration control application and other similar applications particularly when the steady state reference frequency can vary as much as $\pm 3\%$ or more.

*Summary of the invention*

In accordance with the broad principles of the present invention, a phase locked oscillator comprises an electrically controlled variable frequency oscillator with frequency and phase changes of a reference signal even common comparison circuit is preferably employed with separate frequency and phase error detection circuits to determine any differences between the output frequency and phase and the frequency and phase of a reference signal such as a power line signal. Any developed error signal can be amplified and applied to the variable oscillator for output frequency and phase correction. Means are provided for locking the variable oscillator output to the steady state frequency and phase of the reference frequency signal and the output is thus substantially independent of transient frequency and phase changes in the reference frequency signal. The variable frequency oscillator is preferably a voltage controlled unijunction transistor oscillator.

It is, therefore, an object of the invention to provide a novel phase locked oscillator which follows only steady state frequency and phase changes of a reference signal.

Another object of the invention is to provide a novel phase locked oscillator which can follow steady state frequency and phase changes of a reference signal even though the changes have relatively large magnitudes.

An additional object of the invention is to provide a novel phase locked oscillator which follows steady state frequency and phase changes of a reference signal with improved phase and frequency error detecting economy and efficiency.

A further object of the invention is to provide a novel phase locked oscillator which includes a voltage controlled unijunction transistor oscillator and follows steady state frequency and phase changes of a reference signal with reduced jitter.

It is another object of the invention to provide a novel phase locked oscillator which follows steady state frequency and phase changes of a reference signal and which generates a substantially square wave output having substantially equal positive and negative half cycle portions.

It is an additional object of the invention to provide a novel frequency or a phase and frequency error detecting circuit which operates with improved economy and efficiency.

These and other objects of the invention will become more apparent upon consideration of the following detailed description along with the attached drawings.

*Description of the preferred embodiment*

Figure 1:
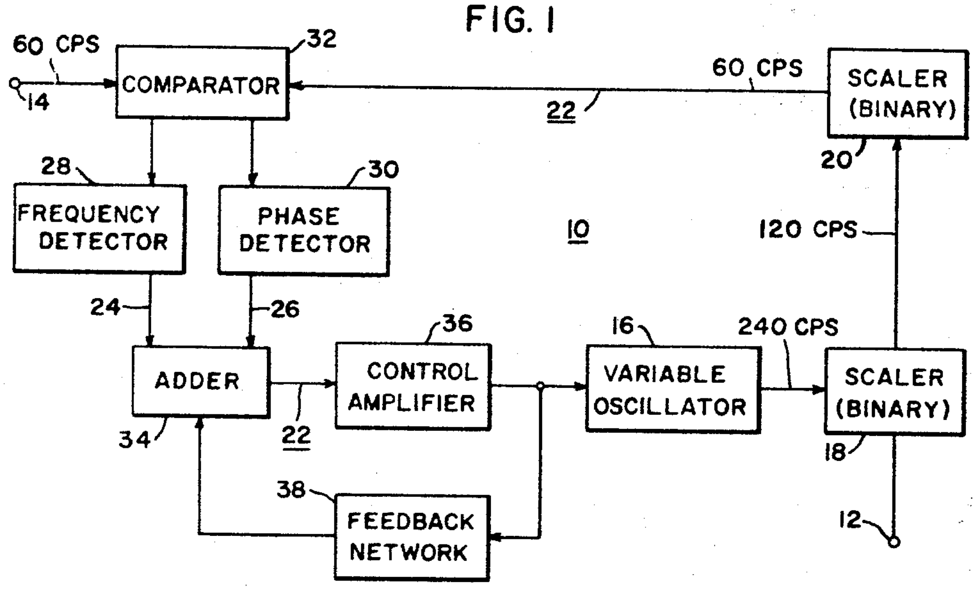
FIGURE 1 shows a block diagram of a phase locked oscillator arranged in accordance with the principles of the invention.

More specifically, there is shown in FIG. 1 a phase locked oscillator 10 arranged in accordance with the principles of the invention to produce an output signal at terminal 12 having a frequency and phase which follow in a predetermined manner the steady state frequency and phase of a preselected reference frequency signal applied at input terminal 14. The phase locked oscillator 10 is in this case arranged to provide integration control in the previously referenced analog input system for a digital computer, and the reference signal is therefore obtained from a utility power system. The power reference waveform has a nominal frequency of 60 cycles per second but is subject to transient and steady state phase shifting and frequency variation. The output signal at the terminal 12 is preferably a square wave having positive and negative half cycles with equal time spans and is applied to the aforementioned integrator to provide gating control.

The phase locked oscillator 10 includes a variable oscillator 16 which in this instance generates nominally 240 pulses per second. The time span between the leading edges of successive pulses is preferably substantially constant at each frequency setting of the variable oscillator 16, i.e., oscillator jitter is preferably small. Frequency scale down is produced by at least one scale down circuit and preferably by two scalers 18 and 20. In this case, frequency scale down to 120 cycles per second is achieved by providing the scaler 18 in bistable circuit form. An output waveform from the binary scaler 18 has the desired integrator gating characteristics and is applied to the output terminal 12. Another output is also coupled to the scaler 20 which in this case is also in bistable circuit form to generate a scaled down frequency of 60 cycles per second for use in feedback control of the phase locked oscillator 10.

Feedback control of the phase locked oscillator 10 is produced by a feedback loop 22 which includes a frequency control loop 24 and a phase control loop 26. The power refernce signal and the oscillator feedback signal are coupled to a comparator 32 which generates an output commonly used by frequency and phase detectors 28 and 30 in the frequency and phase control processes. The frequency detector 28 produces an error signal if there is any difference between the frequencies of the power reference signal and the feedback signal. Similarly, in the phase control loop 26 a phase detector 30 produces an error signal if there is any difference between the phases of the power reference signal and the feedback signal.

Error outputs from the frequency and phase detectors 28 and 30 are coupled to an adder 34 which produces a composite signal for amplification by a control amplifier 36. The output from the amplifier 36 is coupled to the variable oscillator 16 to control the operating frequency, and it is further coupled through a feedback network 38 to the adder 34 so as to provide direct control of the system response characteristics. Thus, the phase locked oscillator 10 can be set so that the variable oscillator 16 changes its output frequency and phase to conform to a new power frequency and phase only if the power waveform change has steady state character. The dividing line between transient and steady state changes in power frequency and phase can be suitably preselected and the response of the phase locked oscillator 10 is adjusted accordingly.

The variable oscillator 16 is preferably provided in the form of a unijunction transistor relaxation oscillator which is operated under voltage control to produce a variable frequency output. Normally, the unijunction oscillator is prearranged to oscillate at the preselected nominal frequency, in this instance 240 cycles per second, and the output frequency range about the nominal value can be relatively small to meet the requirements for steady state power frequency and phase follow. For example, the range of frequency variation for the unijunction oscillator about the nominal frequency value can be about ±5%. The unijunction oscillator is preferred for employment in the phase locked oscillator 10 principally because it can be characterized with relatively low jitter and can therefore be precisely controlled to produce a binary scaler output having the preselected phase and frequency relationship to the steady state power signal. The jitter can be as little as one microsecond or less in one sixtieth of a second.

Figure 2:
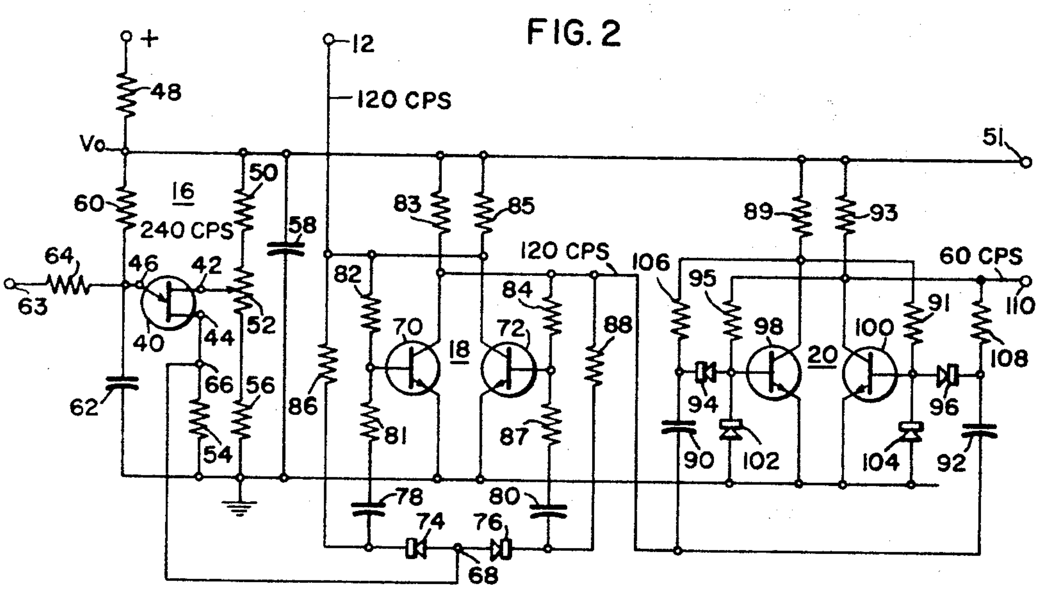
FIG. 2 shows a schematic circuit for a voltage controlled unijunction transistor oscillator and solid state scalers which are preferred for employment in the phase locked oscillator of FIG. 1.

The voltage controlled unijunction transistor oscillator includes a unijunction transistor 40 (FIG. 2) having base terminals 42 and 44 and an emitter terminal 46. A voltage supply dropping resistor 48 is connected to the transistor base terminal 42 through a base resistor 50 and a potentiometer resistor 52. Another resistor 56 and the base resistor 50 generally are preselected to produce the desired range of transistor interbase voltage, and the potentiometer resistor 52 is used for adjusting the unijunction transistor oscillator to the nominal frequency of operation. Capacitor 58 bypasses the series connected resistors 50, 52 and 56 for the purpose of filtering the oscillator power supply. The general oscillation theory for uniunction transistor oscillator circuits is well known and need not be detailed here.

It is generally noted that a timing resistor 60 is coupled to the emitter terminal 46 from the supply resistor 48 and a timing capacitor 62 is coupled from the emitter terminal 46 to ground and operate as basic determinants of the frequency of operation in accordance with the following generally applied formula:

$$f=\frac{1}{RC\ln\left(\frac{1}{1-\eta}\right)}$$

where:

$\eta$=fraction of interbase voltage at the emitter or the intrinsic stand-off ratio $C=C_{62}$ In order to provide for operational variation of the output frequency for the purpose of following steady state changes in the power phase and frequency, a voltage control resistor 64 is connected from input terminal 63 to the emitter terminal 46. Accordingly, in the above frequency formula, the parameter $$R=\frac{R_{60}R_{64}}{R_{60}+R_{64}}$$

and $$\eta=\frac{\alpha}{R/R_{60}+V_{63}R/V_oR_{64}}$$

where $V_{63}$ equals the potential at the terminal 63 and $\alpha$ equals the fraction of the voltage $V_o$ applied at the base terminal 42. The quantity $\alpha$ is set by the potentiometer 52 and, for reasons subsequently made more apparent, is preferably adusted to fix the nominal frequency of oscillation at an input voltage $V_{63}=V_o/2$.

Voltage control by variation of $V_{63}$ results in a relatively narrow range of frequency variation equal to about ±5% which allows adequate margin for frequency and phase control as previously indicated. With suitable feedback control of the voltage $V_{63}$, the oscillator 10 operates with economic and efficient frequency and phase regulation with low jitter characteristics.

The unijunction transistor output comprises a train of pulses at the controlled frequency and it is coupled from terminal 66 to input terminal 68 of the scaler 18. The latter preferably is a conventional bistable circuit which scales down the frequency by one-half as it changes between alternate states in response to the sharp leading edge of successive unijunction transistor pulses. However, the scaler 18 can be formed to produce any predetermined scale down count and therefore need not be a binary scaler.

Preferably, the binary scaler 18 includes a pair of solid state switching devices or grounded emitter transistors 70 and 72. Diodes 74 and 76 and capacitors 78 and 80 direct successive unijunction transistor pulses alternately to the bases of the transistors 70 and 72 in effecting changes in the scaler operating state. The base and collector terminals of the two transistors 70 and 72 are cross-connected through resistors 82 and 84, and resistors 86 and 88 are cross connected from the transistor collectors to the capacitors 78 and 80 so as to produce bistable circuit operation in response to the unijunction transistor pulse train input. The output terminal 12 is connected to the collector terminal of one transistor 72 to produce a 120 cycle per second signal for the gating use previously described.

Since the oscillator 16 is characterized with low jitter and since the binary scaler 18 operates in response to the leading edge of successive oscillator pulses, the signal output at the terminal 12 is characterized with positive and negative half cycles having substantially equal time spans. The same waveform characterization applies to the signal at the collector of the other transistor 70, and it is coupled to the binary scaler 20 through capacitors 90 and 92 and direction diodes 94 and 96.

The scaler 20 is also preferably characterized by bistable operation to produce a frequency scale down of one half, although other downscaling divisions can be obtained with appropriate circuitry. The binary scaler 20 preferably includes a pair of grounded emitter transistors 98 and 100 and other circuitry which is generally similar to that described for the scaler 18. However, reverse connected diodes 102 and 104 are coupled between the transistor base terminals and ground, and the directing diodes and capacitors are reversely connected as compared to the similar directing diodes and capacitors in the scaler 18. Further, resistors 106 and 108 are respectively included in the collector-base circuits of the two transistors 98 and 100 rather than in cross-connected circuitry.

The circuitry provided for the binary scaler 20 is effective to produce changes in state in response to the sharp trailing edge of each half cycle of the waveform output from the binary scaler 18. Since the scaler 18 has an output frequency of 120 cycles per second, the output from the binary scaler 20 has a scaled down frequency of 60 cycles per second and is obtained at the collector terminal of the transistor 100 or output terminal 110 for use in the feedback control loop 22 (FIG. 1). Although the 60-cycle output from the binary scaler 20 can be used as the output gating control signal, two cycles of the 120 cycle per second signal are used to obtain circuit timing advantages as more fully described in the aforementioned copending application.

In the feedback loop 22, the comparator 32 preferably comprises a pair of grounded emitter transistors or other suitable solid state switching devices 112 and 114 (FIG. 3) having base terminals 116 and 118 to which the 60-cycle scaler feedback signal and the 60-cycle reference power signal are respectively connected through base resistors 120 and 122. Collector terminals 124 and 126 of the transistors 112 and 114 are respectively coupled to a voltage supply through respective collector resistors 128 and 130. A resistor 132 in the base emitter circuit of the transistor 112 provides base turnoff current, and a reverse connected diode 134 in the base emitter circuit of the transistor 114 protects the associated transistor base-emitter PN junction against high back voltages associated with the reference power signal. If the reference power signal is a high amplitude sinusoid, amplitude limiting operation of the transistor 114 results in a substantially square wave collector output. The collector outputs from both comparator transistors 112 and 114 are commonly employed in the frequency detector 28 and the phase detector 30 to provide overall economy and efficiency in the phase and frequency detection processes.

It is common for a utility system power waveform to undergo phase shifts of the zero crossing points as much as 20 microseconds or more when transient line conditions occur during line switching operations or the like. Further, particularly in the case of isolated generators, frequency changes as great as about ±3% can occur for long enough time periods to be regarded as steady state changes. Although both transient and steady state phase and frequency changes in the reference power signal are detected by the detectors 28 and 30, the oscillator output is substantially independent of transient changes in the phase and frequency of the reference power signal and is substantially locked to steady state changes in the phase and frequency of the reference power signal. Frequency lock can be achieved by frequency equality or by a fixed frequency ratio between the two compared signals depending upon the circuit constants.

To produce a phase error signal, the phase detector 30 preferably includes an AND circuit having diodes 136 and 138 connected to the comparator collector terminals 124 and 126 and a resistor 140 between the diodes 136 and 138. If both transistors 112 and 114 are non-conductive, the instantaneous potential at the AND junction 142 is substantially equal to the supply voltage. If either transistor 112 or 114 is conducting, the AND junction 142 acquires an instantaneous potential substantially equal to ground potential. Since the amplifier 36 is responsive substantially only to D.C. voltage as subsequently described, only average phase detector voltages at the AND junction 142 have oscillator control significance.

Figure 4:
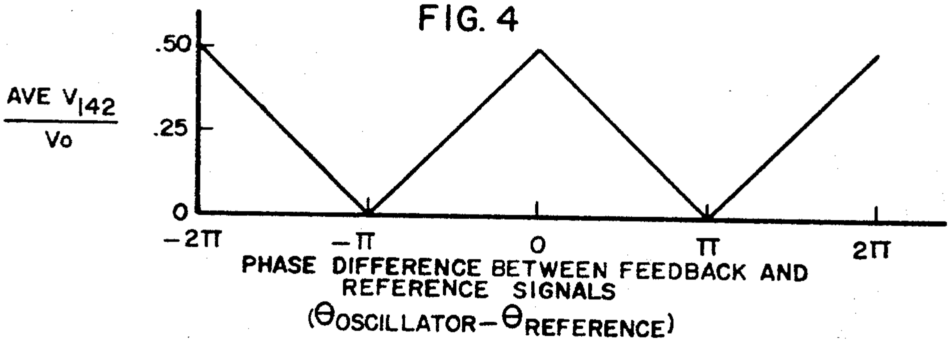
FIGS. 4 and 5 show respective graphs illustrating the feedback circuitry operation in detecting phase and frequency errors.

The average potential $V_{142}$ at the AND junction 142 is a maximum substantially equal to $V_o/2$ when the compared signals are in phase and is equal to zero when the compared signals are 180° out of phase. A 60-cycle per second square wave and an associated average voltage is generated at the junction 142 at the in phase condition. For other phase relationships, the average potential at the junction 142 has intermediate values and the waveform comprises positive pulses having time durations dependent on the phase difference. In FIG. 4, the variation of average $V_{142}$ as a function of phase difference is reflected in the plot of the voltage ratio $V_{142}/V_o$.

The phase detector output is coupled to the control amplifier 36 through a phase resistor 144 in the adder 34. A phase bias resistor 146 in the adder 34 is connected from the voltage supply to a current summing point junction 148 in order to establish a predetermined phase relationship to which the oscillator output signal and the reference power signal are regulated.

The phase detector is operated on one of the ascending slopes of the curve of FIG. 4 in order to achieve feedback stability. For example, if the oscillator output frequency is running fast, the phase error is increasing and a reduced oscillator output frequency is required. Since reduced frequency is obtained by an increased output from the phase detector 30 as will subsequently become more apparent, phase detector operation must be on an ascending slope for stability.

To obtain the maximum range of stable phase regulation, it is preferred that the regulated phase relationship between the oscillator output signal and the reference power signal be a phase difference of 90°. The phase resistors 144 and 146 are therefore preselected to achieve a quiescent or no error average valtage level at the summing junction 148 when the average potential $V_{142}$ at the AND junction 142 corresponds to a 90° phase displacement (FIG. 4). In the present case, an average voltage of $V_o/2$ at the adder summing point junction 148 is preselected as the quiescent operating point for the amplifier input, and at the quiescent input voltage the amplifier 36 generates an output $V_o/2$ which holds the variable oscillator 16 at the nominal frequency in the manner previously described. For steady state phase differences other than 90°, a steady-state phase detector average voltage output at the summing junction 148 differs from the quiescent value and causes the control amplifier 36 to shift the oscillator frequency for steady-state phase correction to the preset 90° phase relationship. Transient changes in the average phase detector output voltage from the quiescent or no error average value have little frequency regulating effect as is subsequently made more apparent. The oscillator output can be regulated to other steady-state phase relationships with the reference power signal if desired by suitable adjustment of the resistance parameters of the resistors 146 and 148.

Frequency control is employed along with phase control in order to enable phase lock to be obtained when relatively large or coarse frequency errors are encountered. The frequency detector 28 preferably includes capacitors 150 and 152 which are connected respectively between the comparator transistor collector terminals 124 and 126 to junction points 154 and 156 between directing diodes 158 and 160 and directing diodes 162 and 164. The diodes 160 and 162 are connected through a junction point 166 to a frequency resistor 168 in the adder 34 to the summing point junction 148 at the input of the control amplifier 36. A storage or frequency output capacitor 170 is coupled between the diode junction point 166 and ground at the output of the frequency detector 28. The other terminal of the diode 158 is connected to ground and the other terminal of the diole 164 is connected to the voltage supply.

In operation, the capacitor 150 is discharged through the diode 158 when the transistor 112 is conducting. The capacitor 150 charges through the diode 160 to charge the capacitor 170 when the transistor 112 is switched from a conductive state to a cut off state. Similarly, the capacitor 152 is discharged through diode 164 when the transistor 114 is cut off and charged through the diode 162 by the capacitor 170 when the transistor 114 is switched to a conductive state.

If the capacitance values of capacitors 150 and 152 are equal and if the frequencies of the compared signals are identical, the average change in the charge on the capacitor 170 is zero and the voltage across the frequency detector output capacitor 170 is maintained at the quiescent value equal in this case to $V_o/2$. With no indicated steady-state frequency error, the amplifier output voltage or the oscillator input voltage $V_{63}$ has the quiescent value and the nominal oscillator frequency is produced.

When the oscillator frequency changes from the regulated value, the average charge on the capacitor 170 either increases or decreases and average voltage across the capacitor 170 changes to initiate correction of the oscillator frequency if the frequency and capacitor voltage deviations are of steady-state character. For example, if the oscillator frequency is running fast, either because it has changed or because the power reference frequency has changed, a relatively increased amount of charge is transferred from the capacitor 150 to the capacitor 170 through the diode 160 and the average voltage across the capacitor 170 is caused to increase with steady-state character. The average amplifier input voltage then rises above the quiescent value and, as considered more fully subsequently, the amplifier output voltage decreases and the oscillator frequency is decreased by the voltage control operation previously considered.

Figure 5:
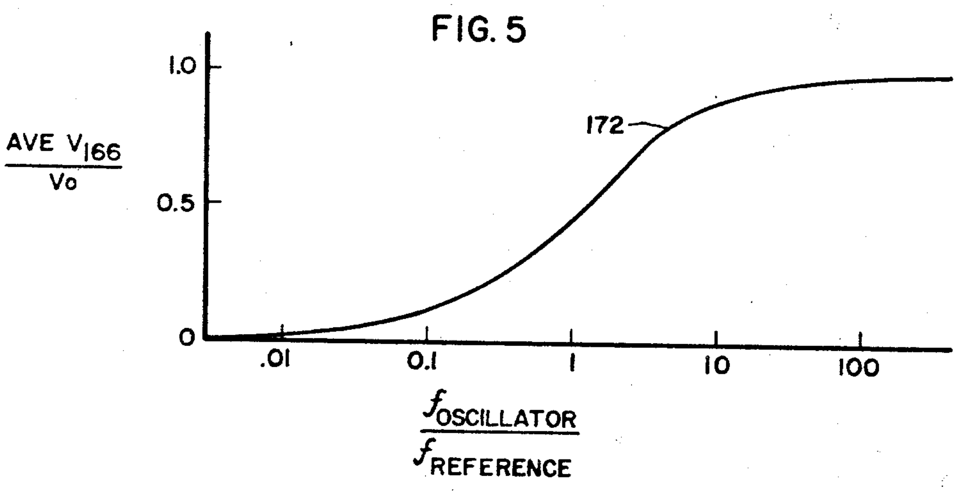

The frequency detector 28 accordingly produces an average output voltage indicative of frequency equality between two variable frequency signals as opposed to the conventional technique of indicating frequency equality between a variable frequency signal and a fixed frequency signal. Other frequency ratios between the controlled frequency and the reference frequency can be regulated simply by changing the frequency scale down arrangement or by changing the quiescent voltage point at the junction 166 or by changing the parameter ratio between the charging capacitors 150 and 152. As shown in FIG. 5, frequency equality is obtained when $V_{166}=V_o/2$. and other voltage values result for $V_{166}$ in correspondence with the ratio of the compared frequencies as indicated by the curve 172.

Current summation of the outputs from the frequency and phase detectors at the junction point 148 produces a composite average input voltage signal for the control amplifier 36. Thus, the average voltage $V_{148}$ at the junction 148 changes from the quiescent value $V_o/2$ when either of the detector output average voltages changes from the quiescent value.

The amplifier feedback network 38 preferably comprises a capacitor 174 connected in series with parallel connected resistor and capacitor elements 176 and 178. The network 38 is connected between the amplifier output at the voltage control terminal 63 to the summing point junction 148 so as to control the system response and stability characteristics. The control amplifier 36 is preferably a high gain DC amplifier, and the amplifier 36 and the feedback network 38 together approximate an integrator. High DC gain is preferred in order to achieve low steady-state phase error and to minimize frequency error prior to achieving phase lock.

Figure 3:
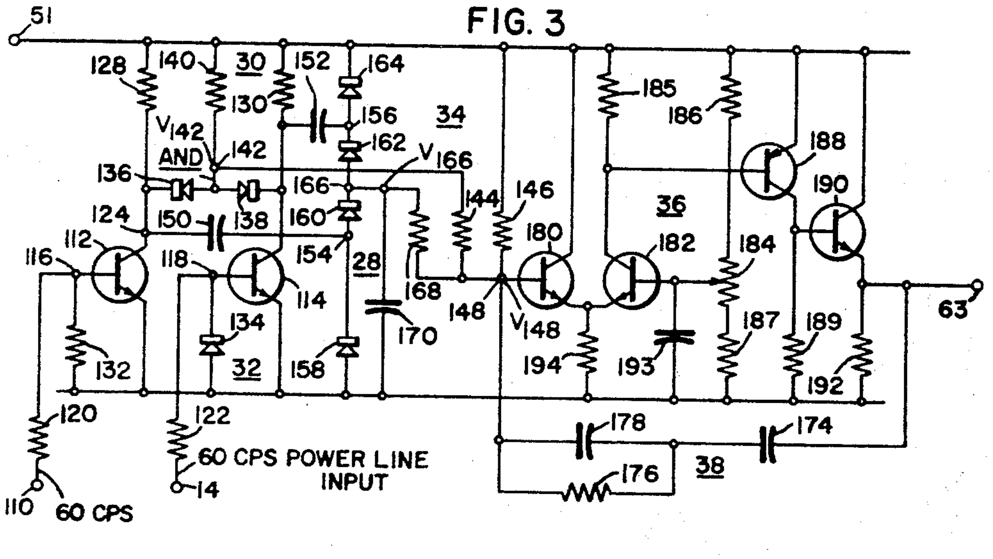
FIG. 3 shows a schematic circuit diagram for feedback control circuitry preferably employed in the phase locked oscillator of FIG. 1.

A conventional amplifier such as the one shown in FIG. 3 can be employed in forming the control amplifier 36. Thus, a pair of transistors 180 and 182 are matched for equal base-emitter drop characteristics in order to obtain a high degree of temperature stability. The summing junction point 148 in the adder 34 is connected to the base terminal of the transistor 180 at the amplifier input. The base terminal of the transistor 182 is connected through a potentiometer 184 and a resistor 186 to the voltage supply so that the potential at the base of the transistor 182 is at the quiescent operating value, i.e., in this instance at $V_o/2$. The collector of the transistor 182 is coupled to the base of another transistor 188 which provides gain in addition to that provided by the transistor 182. An output transistor 190 is connected as an emitter follower and coupled to the transistor 188 to produce current gain and a low output impedance across output resistor 192. Since the amplifier output is applied to the variable oscillator 16 through the coupling resistor 64, the band of operating frequencies for the overall circuitry can be readily varied by changing the value of the coupling resistance.

In operation, an instantaneous change in the average voltage level at the amplifier input junction 148 from the quiescent value results in a change of the voltage at the collector of the transistor 182 which is amplified by the transistor 188. However, change in the voltage level of the amplifier output at the terminal 63 depends on the time constant of the amplifier feedback network 38. Thus, the amplifier voltage output cannot change until the voltage across the feedback capacitor 174 changes, and charging current for the capacitor 174 has a negative or degenerative effect on the amplifier operation.

As an illustration, instantaneously increased current at the summing junction 148, corresponding to an instantaneous increase in the average voltage level of the phase detector output or the frequency detector output or both detector outputs, causes increased current flow through the transistor 180 and increased voltage drop across base emitter resistor 194. Potential at the collector of the transistor 182 is therefore cut back and the amplifier output voltage begins to cut back as the capacitor 174 begins to discharge. The capacitor discharge current subtracts from the detector current into the summing junction 148 and therefore has a negative effect on the original input voltage change.

If the change in the average input voltage persists for a sufficiently long time period, the discharge current from the capacitor 174 has increasingly less negative effect and the amplifier output voltage decreases to the value required for shifting the variable oscillator frequency in a phase or frequency corrective direction. The feedback network 38 is thus a primary determinant of the amplifier response characteristics which are preset such that the variable oscillator 16 is controlled to be independent of transient frequency and phase changes in the power reference signal while following steady-state phase and frequency changes in the power reference signal. As previously indicated, the feedback network components can be preselected to produce oscillator control in response to power signal phase or frequency changes which persist for a predetermined number of power signal cycles such as ten cycles.

From an overall operating standpoint, the phase locked oscillator 10 operates stably and efficiently to produce steady-state phase locking between the oscillator output and a power or other reference signal with either the frequency loop 24 or the phase loop 26 closed or with both the frequency loop 24 and the phase control loop 26 closed. Generally, the frequency control loop 24 provides the dominant control action for coarse frequency differences since the rate at which the average phase voltage $V_{142}$ (FIG. 3) varies about the quiescent value is so great that the control amplifier 36 is non-responsive to it. When the oscillator frequency moves within the range of the phase control, the frequency detector operation acquires decreased control significance since the average frequency error voltage $V_{166}$ is then relatively small. However, the rate at which the average phase voltage $V_{142}$ varies comes within the response range of the control amplifier 36 and the phase control loop accordingly provides the dominant control action until the compared frequencies are equal and phase lock is achieved with the preset phase relationship between the compared signals.

The stable oscillator output frequency control is achieved with an output waveform having low jitter characteristics and time equal positive and negative half cycles while tracking of the steady state frequency and phase of the reference power signal. Thus, the phase locked oscillator can supply a signal with the same average frequency and phase as that of the control or reference signal and without rapid temporary changes in frequency and phase present in the reference signal. Further, the rate at which the circuit can track changes in average frequency can be altered over a wide range by changing the control amplifier feedback characteristics.

The following is a sample table of values for various components in the phase locked oscillator 10 wherein the described results were achieved with the use of a nominal 60-cycle power reference signal and a nominal 240-cycle unijunction transistor relaxation oscillator:

Sample circuit parameters

| | |
|---|---|
| C78, 80, 90, 92, 150, 152 | .01 mfd. |
| C62, 170, 193 | .47 mfd. |
| C178 | 3.0 mfd. Mylar. |
| C174 | 30 mfd. 2X15 Mylar. |
| C58 | 2X250 mfd. |
| Q112, 114, 190, 70, 72, 98, 100 | 2N1711. |
| Q180, 182 | 2N1711 matched pair. |
| Q188 | 2N3251. |
| Q40 | 2N1761A. |
| All diodes | 1N914. |
| R48 | 100. |
| R50 | 200. |
| R52 | 1K POT. |
| R54 | 35.7. |
| R56 | 13K. |
| R60 | 15K. |
| R64 | 100K. |
| R81 | 4.99K. |
| R82 | 22.1K. |
| R83 | 4.99K. |
| R84 | 22.1K. |
| R85 | 4.99K. |
| R86 | 100K. |
| R87 | 4.99K. |
| R88 | 100K. |
| R89 | 4.99K. |
| R91 | 22.1K. |
| R93 | 4.99K. |
| R95 | 22.1K. |
| R106 | 100K. |
| R108 | 100K. |
| R120 | 22.1K. |
| R128 | 22.1K. |
| R130 | 22.1K. |
| R132 | 4.32K. |
| R140 | 22.1K. |
| R144 | 1.2M. |
| R146 | 2.4M. |
| R168 | 100K. |
| R176 | 100K. |
| R184 | 1K POT. |
| R185 | 100K. |

Sample circuit parameters—*Continued*

| | |
|---|---|
| R186 | 10K. |
| R187 | 10K. |
| R189 | 499K. |
| R192 | 10K. |
| R194 | 499K. |

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A frequency and phase detection circuit comprising a comparator circuit having a pair of solid state switching devices with respective control inputs to which respective variable phase and frequency signals are coupled, a phase detector circuit, means coupling said phase detector circuit to the outputs of said switching devices, a frequency detector circuit including a pair of diode directed charging circuits, respective charging capacitors connected with the outputs of said switching devices in the respective charging circuits, a pair of diode directed discharge circuits in which said charging capacitors are respectively connected, and an output capacitor connected with said charging capacitors in the respective charging circuits so as to be operative to charge one of said charging capacitors and to receive charge from the other charging capacitor and so as to produce an output voltage that can be used in producing a predetermined frequency relation between the variable frequency input signals.

2. A frequency equality detection circuit comprising a comparator circuit having a pair of solid state switching devices with respective control inputs to which respective variable frequency signals are coupled, first and second diode directed charging circuits, first and second charging capacitors respectively connected in said charging circuits, first and second diode directed discharge circuits in which said charging capacitors are respectively connected, an output capacitor connected with said charging capacitors in the respective charging circuits, means for coupling one of said switching devices with said first charging circuit and said first discharge circuit to charge said first charging capacitor during one of the states of said one switching device and to allow said first charging capacitor to charge said output capacitor during the other state of said one switching device, and means for coupling the other of said switching devices with said second charging circuit and said second discharge circuit to discharge said second charging capacitor during one of the states of said other switching device and to allow said output capacitor to charge said second charging capacitor during the other state of said other switching device.

3. A phase locked oscillator comprising a variable frequency oscillator, means for detecting frequency and phase error based on a predetermined relation between the frequency and phase of the variable oscillator output signal and the frequency and phase of a variable reference signal, said detecting means including a comparator circuit having a pair of solid state switching devices, means responsive to said detecting means for controlling said variable frequency oscillator, means for characterizing said controlling means with a selectable response characteristic which causes the frequency and phase of the variable oscillator output signal to track those changes in the reference signal frequency and phase that persist for a time period in excess of a predetermined minimum duration, means coupling the variable oscillator output signal and the reference signal respectively to respective control inputs of said switching devices, a phase detector circuit, a frequency detector circuit, means coupling the outputs of said switching devices to said detector circuits, said controlling means responsive to the outputs of said detector circuits.

4. A phase locked oscillator as set forth in claim 3, wherein said frequency detector circuit includes a pair of diode directed charging circuits, respective charging capacitors connected in said charging circuits, a pair of diode directed discharge circuits in which said charging capacitors are respectively connected, an output capacitor connected with said charging capacitors in the respective charging circuits so as to be operative to charge one of said charging capacitors and to receive charge from the other charging capacitor, said switching devices controlling said charging and discharge circuits to charge and discharge said output capacitor in each input signal controlled cycle of operation, said controlling means responsive to the voltage across said output capacitor in producing the predetermined frequency relation between the compared variable frequency signals.

5. A phase locked oscillator as set forth in claim 3, wherein said controlling means includes an adder circuit to which said detectors are coupled, a control amplifier having a feedback network for setting the amplifier response characteristics, said adder circuit coupled to the input of said control amplifier, and means coupling said control amplifier to said variable frequency oscillator to provide variable voltage frequency control.

6. A phase locked oscillator comprising a variable frequency oscillator including a unijunction transistor oscillator circuit having low jitter characteristics, means for detecting frequency and phase error based on a predetermined relation between the frequency and phase of the variable oscillator output signal and the frequency and phase of a variable reference signal, said detecting means including a comparator circuit having a pair of solid state switching devices, means responsive to said detecting means for controlling said variable frequency oscillator; said controlling means including a coupling circuit connected to the unijunction transistor emitter to provide variable voltage frequency control, means including an integrating amplifier for characterizing said controlling means with a selectable response characteristic which causes the frequency and phase of the variable oscillator output signal to track those changes in the reference signal frequency and phase that persist for a time period in excess of a predetermined minimum duration, means coupling the variable oscillator output signal and the reference signal respectively to respective control inputs of said switching devices, a phase detector circuit, a frequency detector circuit, means coupling the outputs of said switching devices to said detector circuits, said controlling means responsive to the outputs of said detector circuits.

7. A phase locked oscillator comprising a variable frequency oscillator including a unijunction transistor oscillator circuit having low jitter characteristics, a bistable frequency scale down circuit connected to the output of said unijunction transistor oscillator and successively changing state in response to the sharp leading edge of successive unijunction transistor output pulses, another bistable frequency scale down circuit connected to an output of the first-mentioned scale down circuit and successively changing state in response to the sharp trailing edge of successive pulses from the first-mentioned scale down circuit, means for detecting frequency and phase error based on a predetermined relation between the frequency and phase of the variable oscillator output signal and the frequency and phase of a variable reference signal, said detecting means including a comparator circuit having a pair of solid state switching devices with respective control inputs to which the variable oscillator output signal and the reference signal are coupled, a phase detector circuit, a frequency detector circuit including a pair of diode directed charging circuits, respective charging capacitors connected with the outputs of said switching devices in said charging circuits, a pair of diode directed discharge circuits in which said charging capacitors are respectively connected, an output capacitor connected with said charging capacitors in the respective charging circuits so as to be operative to charge one of said charging capacitors and to receive charge from the other charging capacitor, means coupling the outputs of said switching devices to said phase detector circuit, means responsive to said detecting means for controlling said variable frequency oscillator, means for characterizing said controlling means with a selectable response characteristic which causes the frequency and phase of the variable oscillator output signal to track those changes in the reference signal frequency and phase that persist for a time period in excess of a predetermined minimum duration, said controlling means including a feedback control amplifier having a preset response characteristic and responsive to the voltage across said output capacitor and the output from said phase detector to produce the predetermined frequency relation and the predetermined phase relation between the compared variable signals, and a resistor coupling the output of said control amplifier to the unijunction transistor emitter to provide variable voltage control of the oscillator frequency.

References Cited

UNITED STATES PATENTS

| | | | |
|---|---|---|---|
| 2,473,853 | 6/1949 | Boykin. | |
| 2,644,138 | 6/1953 | Bond | 332—19 |
| 2,662,214 | 12/1953 | Hugenholtz | 332—19 |
| 3,231,829 | 1/1966 | Reid | 331—20 |

OTHER REFERENCES

Electronic Design, UJT oscillator makes simple FM modulator, May 10, 1965, p. 47.

Edwards et al.: Transistor phase-locked oscillators, AIEE, part I, vol. 77, January 1959.

ROY LAKE, *Primary Examiner.*

J. B. MULLINS, *Assistant Examiner.*

U.S. Cl. X.R.

307—232, 233; 328—134; 331—11, 21, 26